United States Patent
Gupta

(10) Patent No.: US 11,809,984 B2
(45) Date of Patent: Nov. 7, 2023

(54) AUTOMATIC TAG IDENTIFICATION FOR COLOR THEMES

(71) Applicant: Adobe Inc., San Jose, CA (US)

(72) Inventor: Nikhil Gupta, Noida (IN)

(73) Assignee: Adobe Inc., San Jose, CA (US)

(*) Notice: Subject to any disclaimer, the term of this patent is extended or adjusted under 35 U.S.C. 154(b) by 906 days.

(21) Appl. No.: 16/192,386

(22) Filed: Nov. 15, 2018

(65) Prior Publication Data
US 2020/0160167 A1    May 21, 2020

(51) Int. Cl.
*G06N 3/08*    (2023.01)
*G01J 3/52*    (2006.01)

(52) U.S. Cl.
CPC ............... *G06N 3/08* (2013.01); *G01J 3/526* (2013.01)

(58) Field of Classification Search
None
See application file for complete search history.

(56) References Cited

U.S. PATENT DOCUMENTS

| | | | | |
|---|---|---|---|---|
| 7,996,341 B1* | 8/2011 | Kueck | ............... | H04N 1/40012 |
| | | | | 706/12 |
| 8,054,317 B1* | 11/2011 | Wilensky | ............ | G06T 11/001 |
| | | | | 345/593 |
| 9,767,409 B1* | 9/2017 | Makhijani | ........... | G06F 16/7867 |
| 2006/0022994 A1* | 2/2006 | Hussie | ................... | G09G 5/06 |
| | | | | 345/591 |
| 2016/0042225 A1* | 2/2016 | Barak | .................. | G06F 16/583 |
| | | | | 382/118 |
| 2020/0034645 A1* | 1/2020 | Fan | ..................... | G06K 9/4628 |

OTHER PUBLICATIONS

Vinyals et al. Show and Tell: A Neural Image Caption Generator. arXiv. 20 April 20215. [retrieved from internet on Sep. 18, 2021] <URL: https://arxiv.org/pdf/1411.4555.pdf> (Year: 2015).*

J Brownlee. How to Implement a Beam Search Decoder for Natural Language Processing. Jan. 5, 2018. MachineLearningMastery.com. [archived on Jul. 4, 2018] <: URL: https://web.archive.org/web/20180704095834/https://machinelearningmastery.com/beam-search-decoder-natural-language-processing/> (Year: 2018).*

(Continued)

*Primary Examiner* — Bion A Shelden
(74) *Attorney, Agent, or Firm* — FIG. 1 Patents

(57) ABSTRACT

An automatic tag identification system identifies tags for color themes, a color theme referring to a set of multiple colors that work well together to create (e.g., are visually appropriate for creating) a desired effect, and a tag referring to one or more words that describe a color theme. The automatic tag identification system receives an indication of the multiple colors (e.g., five colors) for a color theme. A first machine learning system uses the indicated multiple colors to generate a color theme embedding for the color theme, which is a vector encoding or embedding of the color theme. The second machine learning system uses the color theme embedding generated by the first machine learning system to generate one or more tags that label the color theme. These one or more tags can then be saved as associated with or corresponding to the multiple colors for the color theme.

20 Claims, 11 Drawing Sheets

(56) References Cited

OTHER PUBLICATIONS

H Bahng et al. Coloring with Words: Guiding Image Colorization Through Text-based Palette Generation. Aug. 7, 2018. arXiv. [retrieved on Dec. 1, 2022] <URL: https://arxiv.org/abs/1804.04128v2> (Year: 2018).*
Colormind. Generating color palettes. colormind.io. [archived on Jul. 9, 2017] [retrieved on Dec. 1, 2022] <URL: https://web.archive.org/web/20170709221011/http://colormind.io/blog/> (Year: 2017).*
E Brevdo. How to save outputs in every step using while_loop with tensorflow? Jun. 23, 2016. stack overflow. [retrieved on Dec. 1, 2022] <URL: https://stackoverflow.com/questions/37994294/how-to-save-outputs-in-every-step-using-while-loop-with-tensorflow/37999251> (Year: 2016).*
A Webb. Cross Entropy and Log Likelihood. May 18, 2017. [retrieved from internet on Mar. 4, 2023] <URL: http://www.awebb.info/probability/2017/05/18/cross-entropy-and-log-likelihood.html> (Year: 2017).*
H Yao et al. Negative Log Likelihood Ratio Loss for Deep Neural Network Classification. Apr. 27, 2018. arXiv. [retrieved from internet on Mar. 4, 2023] <URL: https://arxiv.org/pdf/1804.10690.pdf> (Year: 2018).*
S Ulyanin. Notes On Deep Learning Theory, Part 1: The Data-Generating Process. Jan. 31, 2019. Medium. [retrieved from internet on Mar. 4, 2023] <URL:https://medium.com/@stepanulyanin/notes-on-deep-learning-theory-part-1-data-generating-process-31fdda2c8941> (Year: 2019).*
Vinyals, "Show and Tell: Lessons learned from the 2015 MSCOCO Image Captioning Challenge", IEEE Transactions on Pattern Analysis and Machine Intelligence, vol. 39, No. 4, Apr. 2017, pp. 652-663.

* cited by examiner

AUTOMATIC TAG IDENTIFICATION FOR COLOR THEMES

BACKGROUND

Designers oftentimes desire to design based around a particular color theme. This color theme is a set of multiple colors, typically in the range of a few to several colors, that work well together to create a desired effect. For example, a set of several different brown and blue colors may be used to create an effect of a beach feel in a document or presentation. As there are many different shades of brown and blue colors, there can be numerous different sets of multiple colors for each color theme.

It can be difficult for a designer to identify different sets of colors that would create his or her desired effect. This can make it difficult and time-consuming for the designer to generate designs having his or her desired effect.

SUMMARY

An automatic tag identification system as implemented by a computing device is described to identify tags for color themes, each color theme being a set of multiple colors that work well together to create (e.g., are visually appropriate for creating) a desired effect, and each tag being one or more words that describe a color theme. These identified tags can be saved as corresponding to the color themes they describe, and used to subsequently search for color themes using their corresponding tags. In one example, an indication of a color theme is received, the indication of the color theme comprising an indication of multiple colors in a color space. A color theme embedding for the color theme is generated, using a convolutional neural network, based on the indication of the multiple colors. One or more tags for the color theme are determined, using a recurrent neural network, based on the color theme embedding. Each of these one or more tags is at least one word that describes the color theme, and the one or more tags are displayed as corresponding to the color theme.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
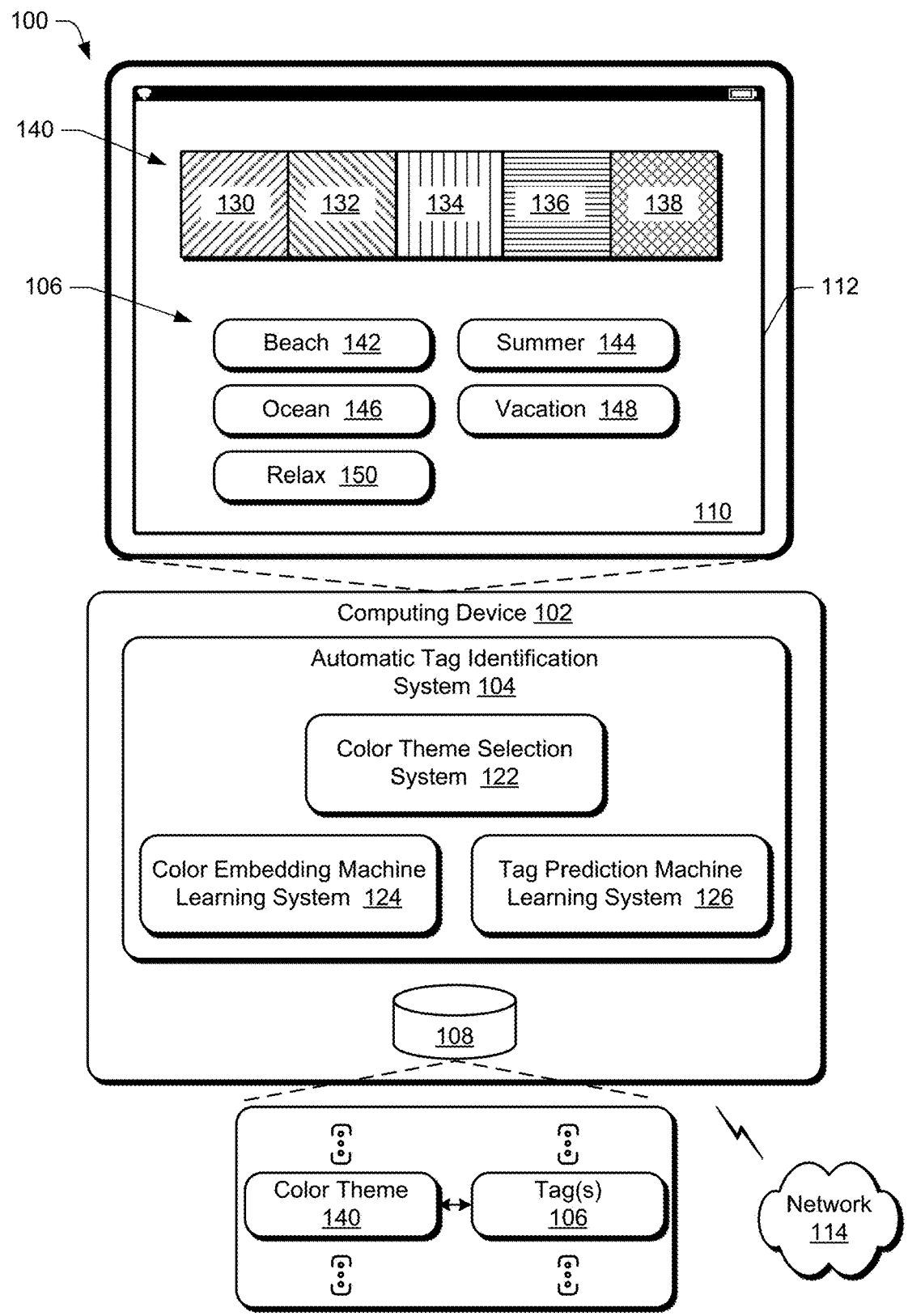
FIG. 1 is an illustration of a digital medium environment in an example implementation that is operable to employ automatic tag identification for color themes techniques described herein.

Automatic tag identification for color themes is discussed herein. A color theme refers to a set of multiple colors that work well together to create (e.g., are visually appropriate for creating) a desired effect. The number of colors in a color theme is typically in the range of a few to several colors, such as from four to seven colors. For example, a set of five different brown and blue colors may be used to create an effect of a beach feel, a set of five different green and red colors may be used to create an effect of a Christmas feel, and so forth. The particular colors included in a color theme can be selected in different manners. For example, the colors included in a color theme can be selected by a user selecting colors from a color wheel, by a user inputting codes or other identifiers of the colors, by extracting colors from an input image using any of a variety of public and/or proprietary techniques, and so forth. By way of another example, an automated system can be used that receives a user input of one or two colors (e.g., user selection from a color wheel) and applies various rules or criteria to select additional colors that work well with the user selected one or two colors.

A tag refers to one or more words that describe the color theme. This description can be a description of various characteristics of the color theme, such as a particular effect, viewer feeling, or viewer thought invoked when viewing the color theme. Examples of tags include "Beach", "Sunny", "Christmas", "Bright", "Sullen", and so forth. These tags can also be referred to as tag keywords or keywords.

Generally, an automatic tag identification system receives an indication of the multiple colors (e.g., five colors) for a color theme. A color theme embedding for the color theme is generated based on the indicated multiple colors by using a first machine learning system. The color theme embedding refers to a vector encoding or embedding of the color theme. One or more tags that label the color theme are determined, using a second machine learning system, based on the color theme embedding. These one or more tags can then be saved as associated with or corresponding to the multiple colors for the color theme. When a user subsequently desires to search for color themes that have one of the generated tags, the user inputs an identifier of the tag (e.g., selects from a list, types in on a keyboard, etc.) and the different color themes associated with or corresponding to that user identified tag are displayed to the user.

More specifically, the first machine learning system can employ a convolutional neural network. The convolutional neural network receives an input color theme that is 5 colors, such as 5 pixels selected from a color wheel. The 5 colors are represented as a set of 15 values (3 components per color, such as RGB (Red Green Blue components)) and the convolutional neural network maps the input color theme to an M-dimensional space that corresponds to a vector embedding of all possible tags (e.g., a set of 800 to 1000 possible tags, resulting in M being 800 to 1000). This mapped-to vector is also referred to as a color theme embedding. The input data length of 15 values is too small relative to the number of possible tags (e.g., which may be in the hundreds or thousands) to just train the convolutional neural network to generate one or more tags for the input color theme. Accordingly, the convolutional neural network maps the input color theme to a color theme embedding, allowing the automatic tag identification system to use the information that is provided by simultaneous occurrence of various tags with particular colors in the set of training data as an additional training signal.

In one implementation, the convolutional neural network includes a 1-dimensional (1D) convolutional layer with a kernel size of 6 (which covers 6 RGB values) to be able to understand the combination of 2 colors. The convolutional neural network includes 10 convolutional filters (also referred to as kernels). The output of this convolutional layer is passed through a Rectified Linear Units (ReLU) activation and then sent through a pooling layer, and then through a fully connected layer to map the result to the same M-dimensional space as the vector embedding of the corresponding tags used by the second machine learning system.

The second machine learning system can employ a recurrent neural network, such as a Long Short Term Memory (LSTM) recurrent neural network that generates a sequence of tags. The color theme embedding generated by the first machine learning system is used to set an initial state of the LSTM, which predicts the sequence of tags. The LSTM is trained to obtain vector representations of all the possible tags (e.g., a set of 800 to 1000 possible tags) in such a manner that the tags that appear together (e.g., are used for the same color themes) are mapped closer to each other in an M-dimensional vector than tags that do not appear together (e.g., are not used for the same color themes). For example, if tags of "Christmas" and "Fire" are used for a lot of color themes, then "Christmas" and "Fire" are mapped close to each other in the M-dimensional vector.

The recurrent neural network is trained with a data set that includes color themes and corresponding actual (already assigned) tags. The recurrent neural network learns the embedding of tags so that tags that appear together are mapped closer to each other by minimizing a cross-entropy loss between the predicted tag and the actual tag in the sequence.

After training the recurrent neural network, upon receiving an input color theme, the initial state of the LSTM is the color theme embedding generated by the first machine learning system based on the input color theme. By using the color theme embedding generated by the first machine learning system, the input color theme biases the LSTM appropriately for use to predict the sequence of tags for the input color theme.

Once the machine learning systems are trained, the automatic tag identification system can be used to automatically generate tags for color themes selected by a user. The tag generated for a color theme can be automatically associated with the color theme, or a user can select one or more of the generated tags to associate with the color theme. An indication of the color themes and their associated tags are stored in a database or other record. When a user subsequently desires to select a color theme having a particular tag, the stored tags can be searched and those color themes that are associated with the particular tag can be displayed or otherwise presented to the user. This allows the user to quickly and easily select a color theme having his or her desired effect.

The use of the machine learning systems discussed herein provide a robust and fast system for generating tags for color themes selected by the user. In contrast to a system that attempts to identify a particular number of color themes and apply an averaging or weighted averaging technique to a threshold number (e.g., 100) of the most similar color themes in a data set, the techniques discussed herein operate faster and allow for real-time use. Searching through large data sets (e.g., millions of color themes) and calculating distances (e.g., Euclidean distances in a LAB (Luminance and color channels a and b)) between a current color theme and each of the millions of color themes is time consuming, making such techniques impractical for use as a real-time service. By using one trained machine learning system to obtain a color theme embedding for a color theme and another trained machine learning system to predict tags, the techniques discussed herein can provide real-time service.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the automatic tag identification for color themes techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an automatic tag identification system 104. The automatic tag identification system 104 is implemented at least partially in hardware of the computing device 102 to identify one or more tags 106 for a color theme, the tags 106 being illustrated as maintained in storage 108 of the computing device 102. The storage 108 can be any of a variety of different types of storage, such as random access memory (RAM), Flash memory, solid state drive, magnetic disk drive, and so forth. The automatic tag identification system 104 can also render the tags in a user interface 110 for output, e.g., by a display device 112. Although illustrated as implemented locally at the computing device 102, functionality of the automatic tag identification system 104 may also be implemented in whole or part via functionality available via the network 114, such as part of a web service or "in the cloud."

An example of functionality incorporated by the automatic tag identification system 104 to identify tags for a color theme is illustrated as a color theme selection system 122, a color embedding machine learning system 124, and a tag prediction machine learning system 126. The color theme selection system 122 implements functionality to receive an indication of a color theme. The color embedding machine learning system 124 implements functionality to generate a color theme embedding for the indicated color theme. The tag prediction machine learning system 126 implements functionality to determine, based on the color theme embedding generated by the color embedding machine learning system 124, one or more tags for the indicated color theme.

A set of multiple colors 130, 132, 134, 136, and 138 that make up a color theme 140 are illustrated as being displayed on the display device 112. Each of the multiple colors 130, 132, 134, 136, and 138 are illustrated with different patterns to represent different colors. An indication of this color theme 140 is input to the automatic tag identification system 104, which identifies multiple tags 106 for the color theme 140. These multiple tags 106 are illustrated as being displayed on the display device 112 as tags 142, 144, 146, 148, and 150. The color theme 140 is stored as associated with the tags 106 in storage 108. This association can be identified or maintained in various different manners, such as including the tags 106 as metadata with the color theme 140, including an identifier of the color theme 140 as metadata with the tags 106, maintaining a table or other record listing color themes and associated tags, and so forth.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Automatic Tag Identification System Architecture

Figure 2:
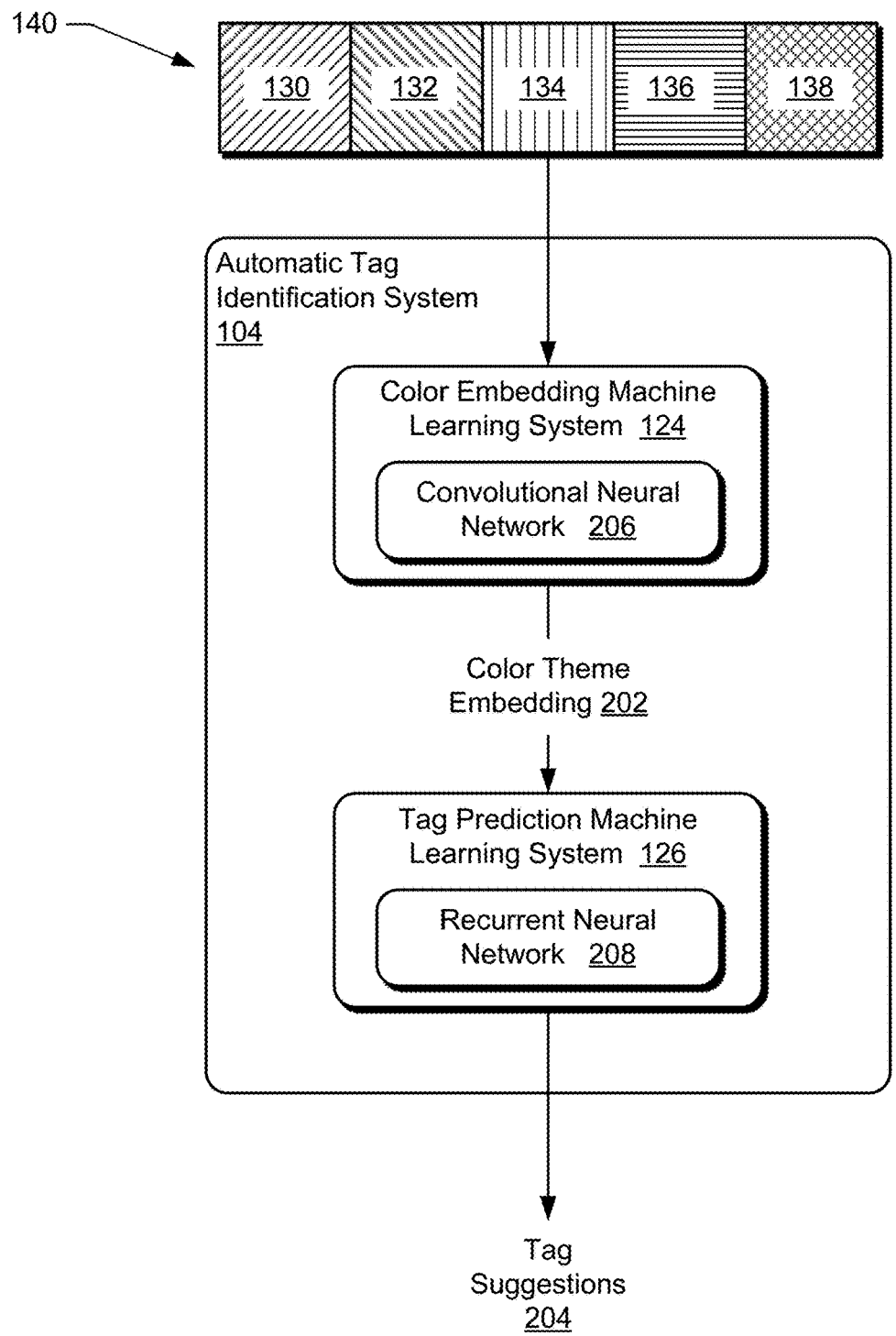
FIG. 2 is an illustration of an example architecture of an automatic tag identification system.

FIG. 2 is an illustration of an example architecture of the automatic tag identification system 104 of FIG. 1. The automatic tag identification system 124 receives an indication of the multiple colors 130, 132, 134, 136, and 138 for the color theme 140. These indications can take various forms. For example, the indications can be values representing 3 components per color in a color space, such as RGB (red, green, blue) components in an RGB color space. By way of another example, the indications can be values representing HSL (hue, saturation, lightness) components in an HSL color space.

The color embedding machine learning system 124 uses the multiple colors from the color theme 140 to generate a color theme embedding 202 for the color theme 140. The tag prediction machine learning system 126 uses the color theme embedding 202 to generate one or more suggested tags 204 that label the color theme 140. The user can select from these one or more suggest tags 204 and have the selected tags saved as associated with or corresponding to the color theme 140.

The machine learning systems 124 and 126 can each be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In the illustrated example, the color embedding machine learning system 124 employs a convolutional neural network 206. Convolutional neural network 206 is formed from layers of nodes (i.e., neurons) and can include various layers such as an input layer, an output layer, and one or more hidden layers such as convolutional layers, pooling layers, activation layers, fully connected layers, normalization layers, and so forth. The convolutional neural network 206 is trained to learn color theme embeddings from input colors, as discussed in more detail below.

The convolutional neural network 206 uses the indicated multiple colors 130, 132, 134, 136, and 138 to generate color theme embedding 202 for the color theme 140. The color theme embedding 202 refers to a vector encoding or embedding of the color theme 140. This encoding is learned through training of the convolutional neural network 206, as discussed in more detail below.

In the illustrated example, the tag prediction machine learning system 126 employs a recurrent neural network 208. Recurrent neural network 208 recognizes patterns in sequences of data. Recurrent neural network 208 includes LSTM units that are formed of cells, input gates, output gates, and forget gates. The recurrent neural network 208 is trained to identify a sequence of suggested tags, as discussed in more detail below.

In an example implementation, the recurrent neural network 208 is an LSTM recurrent neural network. However, the recurrent neural network 208 can be any of a variety of different types or recurrent neural networks. For example, the recurrent neural network can be a gated recurrent unit (GRU) neural network, a neural turing machine (NTM) network, a recursive neural network, and so forth.

The recurrent neural network 208 uses the color theme embedding 202 to generate one or more tag suggestions 204 for the color theme 140. The recurrent neural network 208 further uses an embedding map which embeds or encodes a set of possible tags from which the tag suggestions 204 are identified. The set of possible tags can be represented by a one-hot encoding in which a vector includes a number of components equal to the number of tags in the set of possible tags, and each of those possible tags corresponds to a different component of the vector. Accordingly, if the tag "Beach" corresponds to the fifth component of the vector, then the color theme embedding for a color theme associated with the tag "Beach" would have one value (e.g., "1") as the value of the fifth component and another value (e.g., "0") as the value of all other components. The embedding map converts the input one-hot encoding of a tag into an M-dimensional vector, which can have any value in each of its components.

It should be noted that the automatic tag identification system 104 generates the tag suggestions 204 based on a small number of colors (e.g., 3 to 7 colors in a color space). Thus, in contrast to analyzing all of the colors in an image or having a large number of colors to rely on, a very small number of colors (relative to the number of colors in a typical image) are relied on to generate the tag suggestions 204.

The tag suggestions 204 can then be saved as corresponding to or associated with the multiple colors for the color theme 140, such as in storage 108 of FIG. 1. When a user subsequently desires to search for color themes that have one of the saved tags, the user inputs an identifier of the tag (e.g., selects from a list, types in on a keyboard, etc.), the record of tags and corresponding color themes is searched, and the different color themes associated with or corresponding to that user identified tag are displayed to the user. This allows the user to quickly and easily select a color theme having his or her desired effect.

The tag suggestions 204 for the color theme 140 can be treated as automatically corresponding to the color theme 140, or a user can select one or more of the generated tags that correspond to the color theme. Thus, all tag suggestions 204 can correspond to the color theme 140, or only those tag suggestions 204 that the user selects can correspond to the color theme 140.

Figure 3:
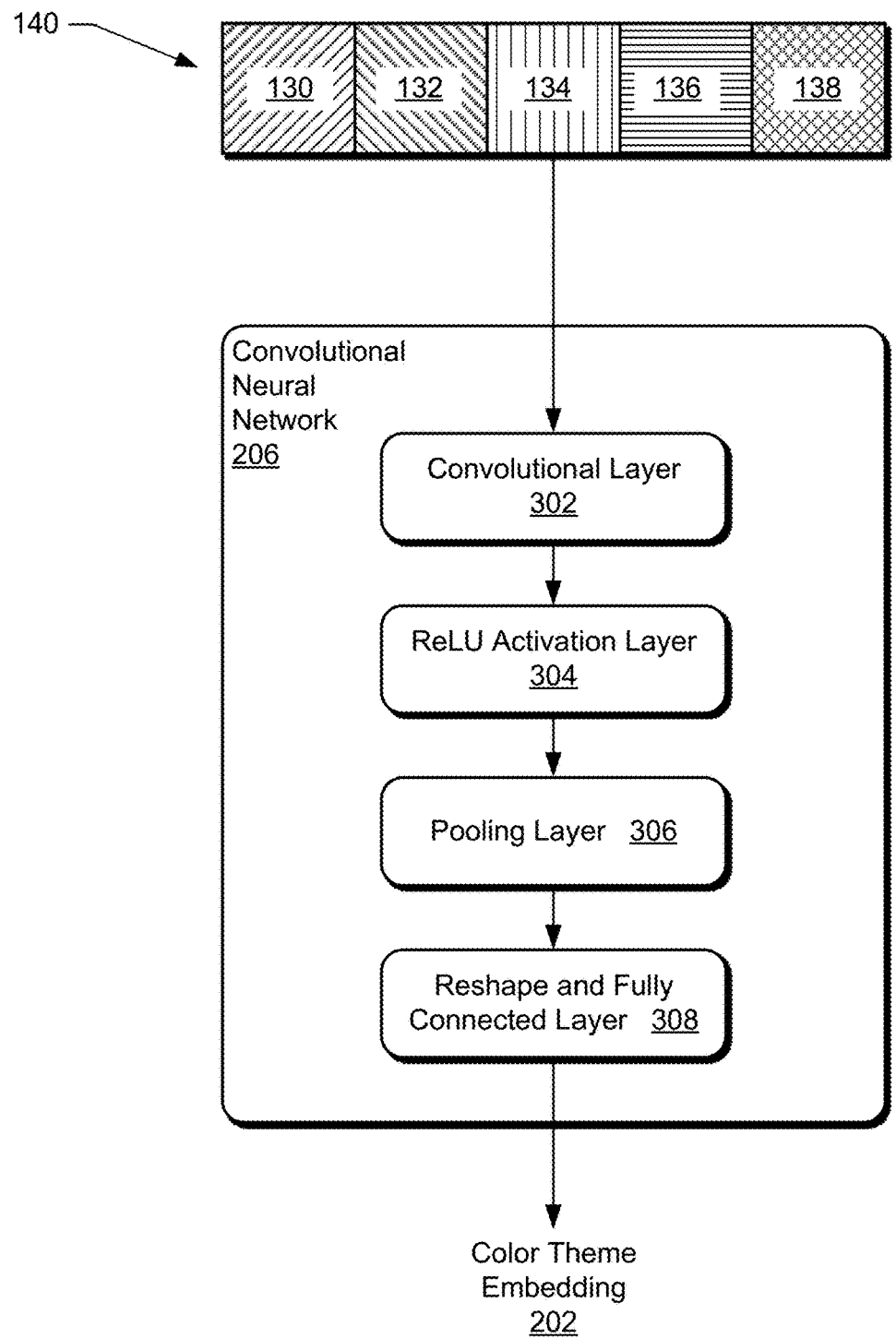
FIG. 3 is an illustration of an example architecture of a convolutional neural network that can be used by the automatic tag identification system.

FIG. 3 is an illustration of an example architecture of the convolutional neural network 206 of FIG. 2. The convolutional neural network 206 includes a convolutional layer 302, a Rectified Linear Units (ReLU) activation layer 304, a pooling layer 308, and a reshaping and fully connected (FC) layer 308.

The convolutional layer 302 receives an input color theme that is 5 colors, such as 5 pixels selected from a color wheel. Each of the 5 colors are represented as a set of 3 values (1 component per color, such as RGB (Red Green Blue colors)), so the input feature vector to the convolutional layer 302 is a 1×15 vector. The convolutional layer 302 is a 1D convolutional layer with a kernel size of 6 (which covers 6 RGB values) to be able to understand the combination of 2 colors, and has a stride of 1 and uses padding. The convolutional layer 302 includes 10 convolutional filters (also referred to as kernels), one convolutional filter for each possible pair of colors in the color theme 140. The output of the convolutional layer 302 is a 9×10 feature vector that is passed to the ReLU activation layer 304.

The ReLU activation layer 304 applies the function $f(x)=\max(0, x)$ to each value in the received 9×10 feature vector, where x refers to a value in the received 9×10 feature vector. The output of the ReLU activation layer 304 is a 9×10 feature vector that is passed to the pooling layer 306.

The pooling layer 306 is a 1×2 layer having a stride of 2, which results in a 5×10 feature vector. The output 5×10 feature vector of the pooling layer 306 is passed to the reshape and fully connected layer 308.

The reshape and fully connected layer 308 converts the received 5×10 feature vector into an M-dimensional space that corresponds to a vector embedding of a set of possible tags. This vector embedding is output by the convolutional neural network 206 as the color theme embedding 202. This color theme embedding 202 is used by the tag prediction machine learning system 126 to generate tag suggestions 204 as discussed in more detail below.

The color theme embedding 202 generated by the convolutional neural network 206 is used to bias the tag prediction machine learning system 126, as discussed in more detail below. Given the use of multiple convolutional filters in the convolutional neural network 206 that take into account the possible pairs of colors in the color theme 140, the color theme embedding 202 is generated based on combinations of colors rather than individual colors.

Figure 4:
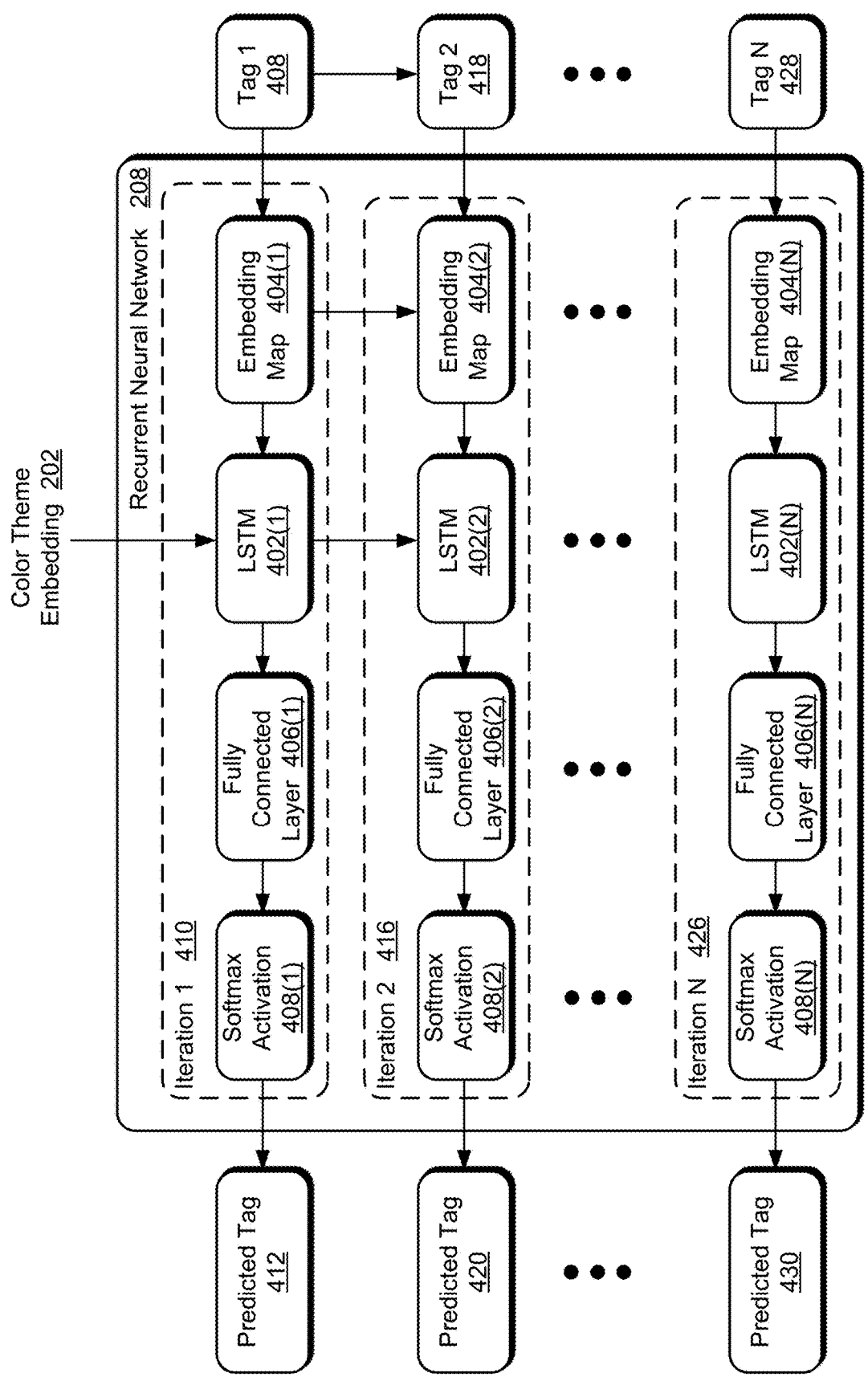
FIG. 4 is an illustration of an example architecture of a recurrent neural network that can be used by the automatic tag identification system.

FIG. 4 is an illustration of an example architecture of the recurrent neural network 208 of FIG. 2. The recurrent neural network 208 operates based on a set of possible tags, also referred to as a vocabulary, which is a set of tags from which the recurrent neural network can identify suggested tags for an input color theme. The set of possible tags can be obtained from various locations, such as a database or record of current tags for color themes, the tags used in the training data, a dictionary or collection of common words, and so forth. For example, the set of tags can be a threshold number (e.g., 800 or 1000) of the most commonly appearing tags in the set of training data used to train the recurrent neural network 208 (discussed in more detail below).

The recurrent neural network 208 includes LSTM units 402(1), . . . , 402(N) and embedding maps 404(1), . . . , 404(N), fully connected layers 406(1), . . . , 406(N), and softmax activation layers 408(1), . . . , 408(N). Although multiple LSTM units 402(1), . . . , 402(N), embedding maps 404(1), . . . , 404(N), fully connected layers 406(1), . . . , 406(N), and softmax activation layers 408(1), . . . , 408(N) are illustrated, it is to be appreciated that the recurrent neural network 208 can include one LSTM unit 402, one embedding map 404, one fully connected layer 406, and one softmax activation layer 408 per tag in the possible set of tags, and use that one LSTM unit 402, one embedding map 404, one fully connected layer 406, and one softmax activation layer 408 recursively.

The embedding map 404 is a mapping of tags to M-dimensional vectors, where M refers to the number of tags in the set of possible tags. A tag (e.g., a one-hot vector identifying the tag) is input to the embedding map 404, and the embedding map 404 outputs an M-dimensional vector corresponding to the input tag. This M-dimensional vector can have any value in each of its components.

During operation, in a first iteration 410 an initial tag 408 is input to the embedding map 404(1). The initial tag 408 is the same each time the automatic tag identification system 104 identifies tags for a color theme. The initial tag 408 can be pre-configured in the automatic tag identification system 104 (e.g., the tag "start"), can be a user setting, can be obtained from another device or service, and so forth. For example, the initial tag 408 can be the most commonly used tag in the training data used to train the recurrent neural network 208. The embedding map 404(1) outputs an M-dimensional vector encoding or embedding of the initial tag 408 to the LSTM 402(1).

An LSTM passes information from one LSTM or iteration to the next, allowing a current LSTM (e.g., the LSTM in the current iteration) to generate its output based on information obtained from a previous LSTM (e.g., the LSTM in the iteration prior to the current iteration). In the illustrated example, the information passed to the current LSTM from the previous LSTM is an indication of a location in the embedding map 402 where the tag predicted by the previous LSTM was located—this provides a context of the tag predicted by the previous LSTM to the current LSTM, allowing the current LSTM to better identify other closely located tags. In the first iteration 410, there is no previous LSTM from which information is passed. Rather, the LSTM 402(1) in the first iteration 410 receives the color theme embedding 202 from the color embedding machine learning system 124, and uses the color theme embedding 202 as it would information passed from a previous LSTM. Thus, by acting as the information passed from a previous LSTM, the color theme embedding 202 is used to bias the LSTM to a particular area or location in the embedding map 404(1), providing a context for the LSTM 402(1) in generating tags.

The recurrent neural network 208 generates a predicted tag 412 based on the color theme embedding 202 and the M-dimensional vector received from the embedding map 404(1). The output of the LSTM 402(1) is an M-dimensional vector the components of which are probabilities of a corresponding tag being the tag predicted by the LSTM 402(1). This M-dimensional output is passed through the fully connected layer 406(1) to obtain a vector in the vocabulary space (the set of possible tags, such as an 800-component vector), and through the softmax activation 408(1) to generate the probabilities for each component. For example, using one-hot encoding, if the 25$^{th}$ component corresponds to the tag "Beach", and the 25th component of the M-dimensional vector output by the softmax activation 408(1) has a value of 0.85, then the M-dimensional vector output by the softmax activation 408(1) indicates that the tag predicted by the first iteration 410 of the recurrent neural network 208 has an 85% probability of being "Beach".

The predicted tag 412 is one or more of the tags corresponding to a component of the M-dimensional vector output by the softmax activation 408(1) having a value greater than 0 The predicted tag 412 can be a single tag (e.g., the tag corresponding to the component of the M-dimensional vector output by the softmax activation 408(1) having the largest value), or can be multiple tags allowing different chains of tags to be analyzed as discussed in more detail below.

In a second iteration 416, a tag 418 is input to the embedding map 404(2). During regular operation, the tag 418 is the predicted tag 412 generated in the first iteration 410; during training of the recurrent neural network 208, the tag 418 is the actual next tag in the sequence rather than the predicted tag 412. The second iteration 416 can be performed with, for example, the predicted tag 412. The embedding map 404(2) outputs an M-dimensional vector encoding or embedding of the tag 418 to the LSTM 402(2).

An LSTM passes information from one LSTM or iteration to the next, allowing a current LSTM (e.g., the LSTM in the current iteration) to generate its output based on information obtained from a previous LSTM (e.g., the LSTM in the iteration prior to the current iteration). In the second iteration 416, the previous LSTM is the LSTM 402(1), and information is passed from the LSTM 402(1) to the LSTM 402(2).

The LSTM 402(2) generates an M-dimensional vector output based on information passed from LSTM 402(1) and the M-dimensional vector received from the embedding map 404(2). This M-dimensional output is passed through the fully connected layer 406(2) to obtain a vector in the vocabulary space (the set of possible tags, such as an 800-component vector), and through the softmax activation 408(2) to generate probabilities for each component. Analogous to the softmax activation 408(1), the output of the softmax activation 408(2) is an M-dimensional vector the components of which are probabilities of a corresponding tag being the tag predicted by the second iteration 416 of the recurrent neural network 208. The predicted tag 420 is one or more of the tags corresponding to a component of the M-dimensional vector output by the softmax activation 408(2) having a value greater than 0. The predicted tag 412 can be a single tag (e.g., the tag corresponding to the component of the M-dimensional vector output by the softmax activation 408(2) having the largest value), or can be multiple tags allowing different chains of tags to be analyzed as discussed in more detail below.

In each following iteration, during regular operation a tag predicted from the previous iteration is input to the embedding map, which outputs an M-dimensional vector encoding or embedding of the tag (during training of the recurrent neural network 208, the actual next tag in the sequence rather than the tag predicted in the previous iteration is input to the embedding map). During regular operation, the LSTM in the current iteration generates a predicted tag based on the tag predicted in the previous iteration and the M-dimensional vector received from the embedding map (during training of the recurrent neural network 208, the actual next tag in the sequence is used rather than the tag predicted in the previous iteration). The output of the LSTM in the current iteration is an M-dimensional vector output. This M-dimensional output is passed through a fully connected layer to obtain a vector in the vocabulary space (the set of possible tags, such as an 800-component vector), and through a softmax activation to generate probabilities for each component. The predicted tag from the recurrent neural network 208 in the current iteration is one or more of the tags corresponding to a component of the M-dimensional vector output by the softmax activation 408 in the current generation having a value greater than 0.

This process continues for N iterations. In the last (Nth) iteration 426, during regular operation, a tag 428 predicted from the previous iteration is input to the embedding map 404(N), which outputs an M-dimensional vector encoding or embedding of the tag (during training of the recurrent neural network 208, the actual next tag in the sequence rather than the tag predicted in the previous iteration is input to the embedding map). During regular operation, the softmax activation 408(N) generates a predicted tag 430 based on the tag predicted in the previous iteration (an iteration N−1) and the M-dimensional vector received from the embedding map 404(N), although during training of the recurrent neural network 208, the actual next tag in the sequence is used rather than the tag predicted in the previous iteration. The output of the LSTM 402(N) is an M-dimensional vector output. This M-dimensional output is passed through the fully connected layer 406(N) to obtain a vector in the vocabulary space (the set of possible tags, such as an 800-component vector), and through the softmax activation 408(N) to generate probabilities for each component. The predicted tag 430 is one or more of the tags corresponding to a component of the M-dimensional vector output by the softmax activation 408(N) having a value greater than 0.

The number of iterations performed (the value of N) can be determined in a variety of different manners. For example, the number of iterations can be a particular number (e.g., 3 or 5), can be based on probabilities output by the softmax activations (e.g., continue until the highest probability output by a softmax activation is less than a threshold amount such as 65%, or until the product of probabilities generated by a softmax activation 408 is less than a threshold amount such as 2%), and so forth. These numbers or threshold amounts can be specified in a variety of different manners, such as learned by the recurrent neural network 208 during training of the recurrent neural network, set as user preferences, and so forth.

Figure 5:
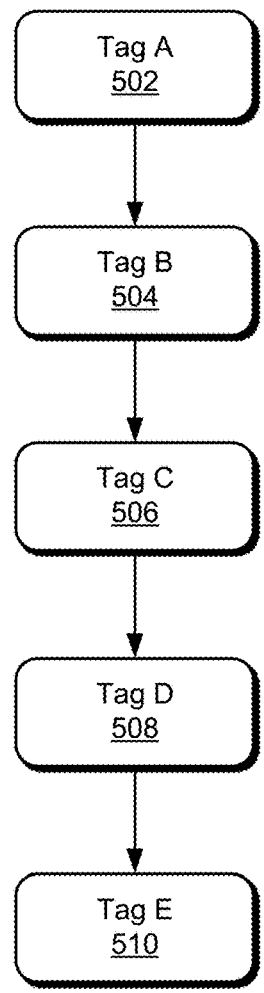
FIG. 5 illustrates an example sequence of predicted tags.

In one or more implementations, the tag input to the embedding map 404 during the second and subsequent iterations is the tag predicted by the previous iteration as having the highest probability of being the next tag in the sequence. FIG. 5 illustrates an example sequence 500 of predicted tags. During regular operation (rather than training), the first iteration of the recurrent neural network 208 of FIGS. 2 and 4 generates an M-dimensional vector indicating a Tag A has the highest probability of being the next tag in the sequence. Accordingly, Tag A 502 is output as the predicted tag by the first iteration of the recurrent neural network 208. Tag A 502 is input to the embedding map 404 in the next iteration of the recurrent neural network 208, which generates an M-dimensional vector indicating a Tag B has the highest probability of being the next tag in the sequence. Accordingly, Tag B 504 is output as the predicted tag by the second iteration of the recurrent neural network 208. This process continues until the Nth tag (Tag E 502) is output by the Nth iteration of the recurrent neural network 208.

Additionally or alternatively, after each iteration, multiple tag chains can be generated using multiple tags predicted from that iteration. For example, rather than the tag input to the embedding map 404 in the next iteration being the tag predicted in the current iteration as having the highest probability of being the next tag in the sequence, one tag chain can be input for each of a threshold number of (e.g., 3 or 4) tags predicted in the current iteration as having the highest probabilities of being the next tag in the sequence.

This process results in numerous different tag chains, and a probability value for each tag chain is generated. The probability value for a chain can be calculated in different manners, such as a product generated by multiplying together all of the non-zero probabilities for the predicted tags in the chain, by multiplying together a threshold number of the non-zero probabilities (e.g., the 3 or 4 highest non-zero probabilities) in each link of the tag chain (each link corresponding to an iteration of the recurrent neural network 208), and so forth. The tag chain having the highest probability value is selected, and the tags in the selected tag chain are output as the tags for the sequence.

Figure 6:
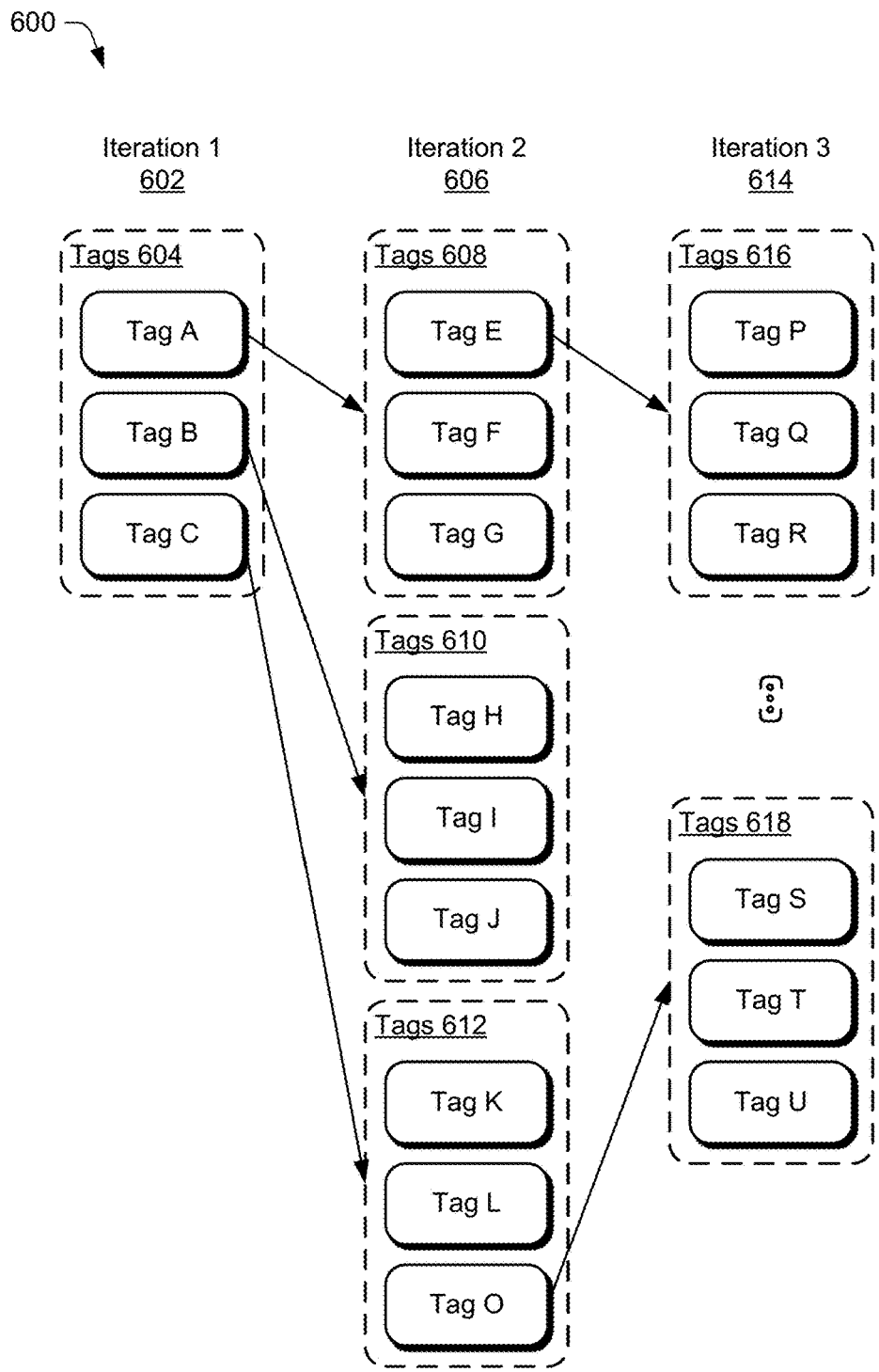
FIG. 6 illustrates an example sequence of predicted tags generated using tag chains.

FIG. 6 illustrates an example sequence 600 of predicted tags generated using tag chains. In a first iteration 602 of the recurrent neural network 208, a set of three tags 604 shown as Tag A, Tag B, and Tag C are predicted as having the highest probabilities of being the next tag in the sequence. In the second iteration 606 of the recurrent neural network 208, three different tag chains are followed, each tag chain beginning with one of Tag A, Tag B, and Tag C. One tag chain is continued by inputting Tag A to the embedding map 404, and a set of three tags 608 shown as Tag E, Tag F, and Tag G are predicted as having the highest probabilities of being the next tag in the sequence. One tag chain is continued by inputting Tag B to the embedding map 404, and a set of three tags 610 shown as Tag H, Tag I, and Tag J are predicted as having the highest probabilities of being the next tag in the sequence. Another tag chain is continued by inputting Tag C to the embedding map 404, and a set of three tags 612 shown as Tag K, Tag L, and Tag O are predicted as having the highest probabilities of being the next tag in the sequence.

In the third iteration 614 of the recurrent neural network 208, nine different tag chains are followed, each tag chain continuing from one of Tag E, Tag F, Tag G, Tag H, Tag I, Tag J, Tag K, Tag L, and Tag O. For example, one tag chain is continued by inputting Tag E to the embedding map 404, and a set of three tags 616 shown as Tag P, Tag Q, and Tag R are predicted as having the highest probabilities of being the next tag in the sequence. By way of another example, another tag chain is continued by inputting Tag O to the embedding map 404, and a set of three tags 618 shown as Tag S, Tag T, and Tag V are predicted as having the highest probabilities of being the next tag in the sequence.

This process continues for each subsequent iteration, with one tag chain continuing from each tag predicted as being one of the tags predicted as having the highest probabilities of being the next tag in the sequence.

This process results in multiple tag chains, each link in a tag chain corresponding to an iteration and including a tag that is one of the tags predicted as having the highest probabilities of being the next tag in the sequence in that iteration. For example, as illustrated in FIG. 6, one tag chain is Tag A, Tag E, Tag P. Another tag chain is Tag A, Tag E, Tag R. Another tag chain is Tag C, Tag O, Tag S. Another tag chain is Tag C, Tag O, Tab T.

The probability of each value in a tag chain can be calculated in different manners, such as by multiplying together the probabilities of each tag in the tag chain from each iteration. The tag chain having the highest probability value is selected, and the tags in the selected tag chain are output as the tags for the sequence. For example, in the first iteration 602, assume that Tag A was predicted as having a probability of 0.5 and Tag C was predicted as having a probability of 0.4. In the second iteration 606, assume that Tag E was predicted as having a probability of 0.65 and Tag O was predicted as having a probability of 0.85. In the third iteration 614, assume that Tag P was predicted as having a probability of 0.45, Tag R was predicted as having a probability of 0.1, Tag S was predicted as having a probability of 0.5, and Tag T was predicted as having a probability of 0.45.

Continuing with this example, the probability value for the tag chain Tag A, Tag E, Tag P is 0.5×0.65×0.45=0.146. The probability value for the tag chain Tag A, Tag E, Tag R is 0.5×0.65×0.1=0.033. The probability value for the tag chain Tag C, Tag O, Tag S is 0.4×0.85×0.5=0.17. The probability value for the tag chain is Tag C, Tag O, Tab T 0.4×0.85×0.45=0.153. The tag chain Tag C, Tag O, Tag S has the highest probability value, so Tag C, Tag O, and Tag S are output as the tags for the sequence.

Using tag chains allows errant (e.g., incorrect or inconsistent) tags to be ignored and not displayed as a tag corresponding to a color theme. For example, continuing with the previous example, although in the first iteration Tag A has a higher probability than Tag C, Tag A can be viewed as an errant tag because the tag chains beginning with Tag C led to tag chains having higher probabilities. Thus, a mis-identification of a tag in the first iteration does not result in all of the suggested tags being errant.

Machine Learning System Training

The convolutional neural network 206 of FIGS. 2 and 3 and the recurrent neural network 208 of FIGS. 2 and 4 are trained using a collection of known tags for multiple color themes. These known tags used to train the recurrent neural network 208 can be known in a variety of different manners. For example, the known tags can have been previously identified as corresponding to a color theme based on user selection/input identifying the correspondence, and the color theme embedding can similarly be identified by user selection/input or can be identified by the convolutional neural network 206.

Training the recurrent neural network 208 is similar to operation of the recurrent neural network 208 to identify tags for an input color theme embedding, however differs in that the input to the embedding map for each iteration is a known tag and that the LSTM and embedding map 404 are updated as part of the training. During training, a known set of tags for a color theme embedding is used.

In a first iteration 410 an initial tag 408 is input to the embedding map 404(1). The initial tag 408 is the same each time the automatic tag identification system 104 identifies tags for a color theme. The initial tag 408 can be pre-configured in the automatic tag identification system 104 (e.g., the tag "start"), can be a user setting, can be obtained from another device or service, and so forth as discussed above.

An LSTM passes information from one LSTM or iteration to the next, allowing a current LSTM (e.g., the LSTM in the current iteration) to generate its output based on information obtained from a previous LSTM (e.g., the LSTM in the iteration prior to the current iteration). In the first iteration 410, there is no previous LSTM from which information is passed. Rather, the LSTM 402(1) in the first iteration 410 receives the known color theme embedding (e.g., the color theme embedding 202 from the color embedding machine learning system 124), and uses the color theme embedding 202 as it would information passed from a previous LSTM. Thus, by acting as the information passed from a previous LSTM, the color theme embedding 202 is used to bias the LSTM in generating tags.

The recurrent neural network 208 generates a predicted tag 412 based on the color theme embedding 202 and the M-dimensional vector received from the embedding map 404(1). The output of the LSTM 402(1) is an M-dimensional vector the components of which are probabilities of a corresponding tag being the tag predicted by the LSTM 402(1). This M-dimensional output is passed through the fully connected layer 406(1) to obtain a vector in the vocabulary space (the set of possible tags, such as an 800-component vector), and through the softmax activation 408(1) to generate the probabilities for each component. During training, the predicted tag 412 is one tag corresponding to a component of the M-dimensional vector output by the softmax activation 408(1) having a value greater than 0, such as the tag corresponding to the component of the M-dimensional vector output by the softmax activation 408(1) having the largest value.

In the second iteration 416, a tag 418 is input to the embedding map 404(2). During training, rather than being a tag predicted in the first iteration 410, the tag 418 is the first known tag for the color theme embedding. The embedding map 404(2) outputs an M-dimensional vector encoding or embedding of the tag 418 to the LSTM 402(2). An LSTM passes information from one LSTM or iteration to the next, allowing a current LSTM (e.g., the LSTM in the current iteration) to generate its output based on information obtained from a previous LSTM (e.g., the LSTM in the iteration prior to the current iteration). In the second iteration 416, the previous LSTM is the LSTM 402(1), and information is passed from the LSTM 402(1) to the LSTM 402(2).

The LSTM 402(2) generates an M-dimensional vector output based on information passed from LSTM 402(1) and the M-dimensional vector received from the embedding map 404(2). This M-dimensional output is passed through the fully connected layer 406(2) to obtain a vector in the vocabulary space (the set of possible tags, such as an 800-component vector), and through the softmax activation 408(2) to generate probabilities for each component. Analogous to the softmax activation 408(1), the output of the softmax activation 408(2) is an M-dimensional vector the components of which are probabilities of a corresponding tag being the tag predicted by the softmax activation 408(2). During training, the predicted tag 420 is one tag corresponding to a component of the M-dimensional vector output by the softmax activation 408(2) having a value greater than 0, such as the tag corresponding to the component of the M-dimensional vector output by the softmax activation 408(2) having the largest value.

In each following iteration, the next known tag for the color theme embedding is input to the embedding map, which outputs an M-dimensional vector encoding or embedding of the tag. The LSTM in the current iteration generates a predicted tag based on the information passed from the LSTM in the previous iteration and the M-dimensional vector received from the embedding map. The output of the LSTM in the current iteration is an M-dimensional vector output. This M-dimensional output is passed through a fully connected layer to obtain a vector in the vocabulary space (the set of possible tags, such as an 800-component vector), and through a softmax activation to generate probabilities for each component. During training, the predicted tag from the recurrent neural network 208 in the current iteration is one tag corresponding to a component of the M-dimensional vector output by the softmax activation 408 having a value greater than 0, such as the tag corresponding to the component of the M-dimensional vector output by the softmax activation 408 having the largest value.

After each iteration, a loss between the predicted tag and the actual tag is calculated. This loss can be calculated in various manners, such as by calculating a softmax cross-entropy loss between the predicted tag and the actual tag is calculated. For example, after the first iteration 410, the softmax cross-entropy loss between the predicted tag 412 and the first known tag for the color theme embedding (which will be input as tag 418 in the second iteration 416) is generated. For the recurrent neural network 208, weights for various gates of the LSTM 402 as well as the embedding map 404 are updated as part of the training by minimizing the softmax cross-entropy loss between the predicted tag and the actual tag. The embedding map 404 is updated so that the tags that appear together in a large number of color themes are mapped closer to each other in the embedding map 404. This gives the LSTM units 202 context for a tag, knowing that tags closer to a given tag in the embedding map 404 occur more often together in color themes than tags further from the given tag. For the convolutional neural network 206, weights of the convolutional filters of the convolutional layer 302 and the reshape and fully connected layer 308 are adjusted to minimize the softmax cross-entropy loss between the predicted tag and the actual tag. For purposes of minimizing the softmax cross-entropy loss between the predicted tag and the actual tag, the predicted and actual tags can be represented in different manners. For example, the predicted tag can be the M-dimensional vector output by the recurrent neural network 208, and the actual tag can be an M-dimensional vector representing the actual tag (e.g., generated by the embedding map 404).

During training, this process continues for N iterations, stopping when the recurrent neural network 208 outputs a predicted tag that is the last (Nth) known tag corresponding to the color theme embedding. In situations in which the recurrent neural network 208 has not output the last known tag corresponding to the color theme embedding but all known tags corresponding to the color theme embedding have been input to the recurrent neural network 208 during different iterations, the known tags corresponding to the color theme embedding can be re-used (e.g., beginning with the first known tag) until the recurrent neural network 208 outputs a predicted tag that is the last (Nth) known tag corresponding to the color theme embedding.

The recurrent neural network 208 is thus trained to obtain M-dimensional vector representations of all the possible tags in such a manner that the tags that appear together in the known tags for color themes (e.g., are used for the same color themes) are mapped closer to each other in the M-dimensional vector than tags that do not appear together in the known tags for color themes (e.g., are not used for the same color themes). For example, if tags of "Christmas" and "Fire" are used for a lot of color themes, then "Christmas" and "Fire" are mapped close to each other in the M-dimensional vector. The mappings of tags to M-dimensional vectors in the embedding map 404, as well as weights of gates in the LSTM 402, are updated during the training to reduce (e.g., minimize) the softmax cross-entropy loss between the predicted tag (the predicted next tag in the sequence) and the actual tag (the actual next tag in the sequence).

It should be noted that during training of the convolutional neural network 206 and the recurrent neural network 208, the color theme is used as it is obtained without shuffling the order of the color theme. Accordingly, the convolutional neural network 206 and/or the recurrent neural network 208 may be trained to take into account the order of the color theme.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-6.

Figure 7:
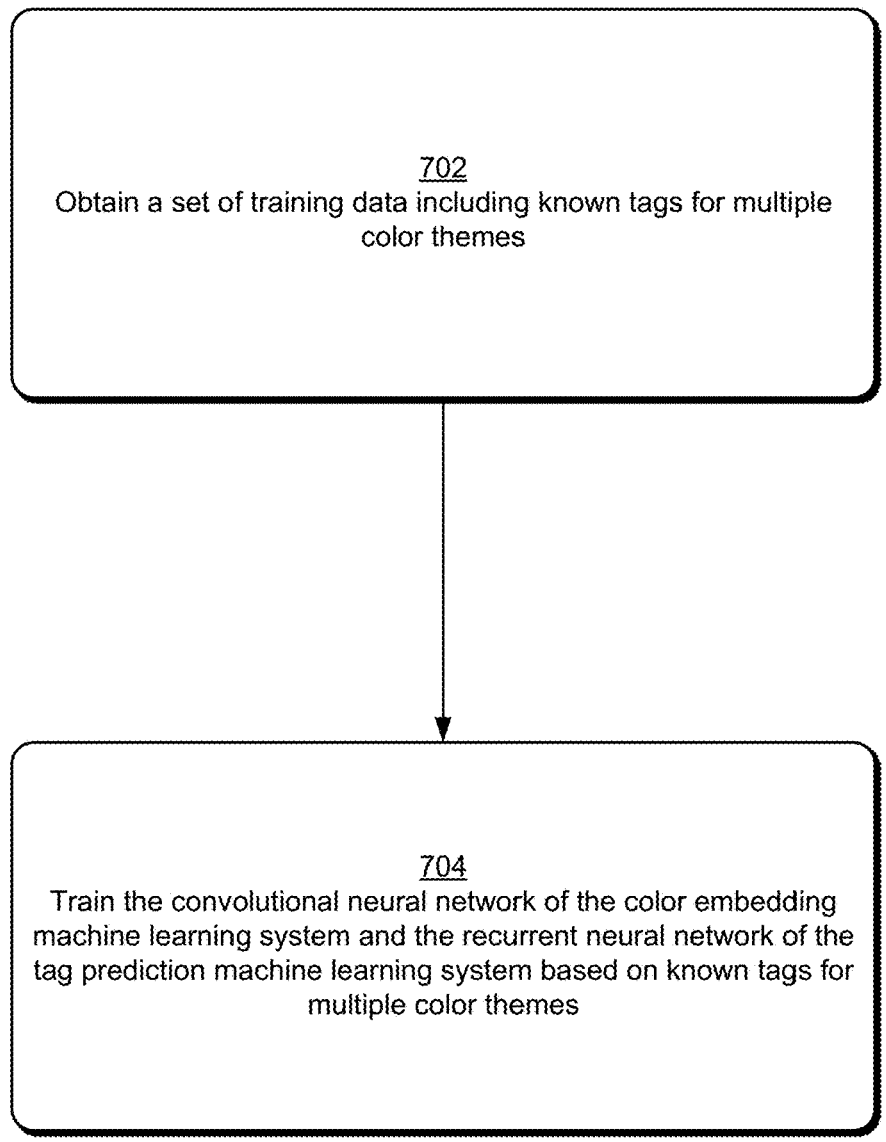
FIG. 7 is a flow diagram depicting a procedure in an example implementation of automatic tag identification for color themes.

FIG. 7 is a flow diagram depicting a procedure in an example implementation of automatic tag identification for color themes. In this example, the automatic tag identification system 104 is trained to determine tag suggestions for a color theme. The tag suggestions are determined from a set of possible tags, and is also referred to as generating or identifying tags for the color theme.

A set of training data is obtained (block 702). The set of training data includes known tags for multiple color themes. The set of training data can be obtained from various sources, such as a database or repository of known tags for corresponding color themes, user input of tags for corresponding color themes, and so forth.

The convolutional neural network of the color embedding machine learning system and the recurrent neural network of the tag prediction machine learning system are trained based on the known tags for multiple color themes (block 704). The training of the recurrent neural network is performed by comparing predicted tags for a color theme to the known (actual) tags for that color theme, and weights of the gates of the recurrent neural network as well as the embedding map are adjusted to minimize the loss (e.g., the softmax cross-entropy loss) between the predicted tags and the known tags. The training of the convolutional neural network is performed by comparing predicted tags for a color theme to the known (actual) tags for that color theme, and weights of the layers of the convolutional neural network are adjusted to minimize the loss (e.g., the softmax cross-entropy loss) between the predicted tags and the known tags.

Figure 8:
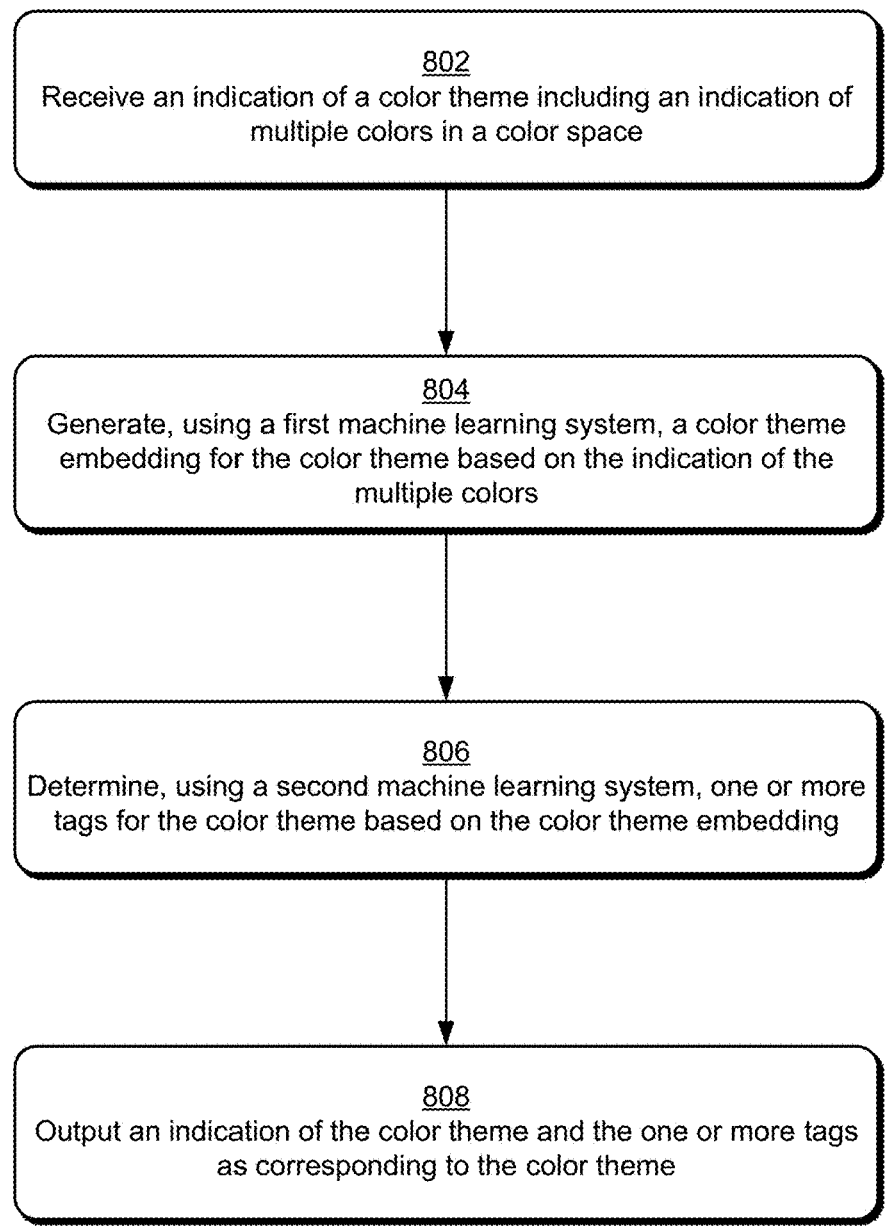
FIG. 8 is a flow diagram depicting a procedure in another example implementation of automatic tag identification for color themes.

FIG. 8 is a flow diagram depicting a procedure in another example implementation of automatic tag identification for color themes. In this example, the automatic tag identification system 104 determines suggested tags for a color theme.

An indication of a color theme is received (block 802). The indication of the color theme includes an indication of multiple colors in a color space, such as 3-7 colors. The number of the multiple colors in the color theme is significantly less than the number of colors in a typical image.

A color theme embedding for the color theme is generated based on the indication of the multiple colors (block 804). The color theme embedding is generated using a first machine learning system, which may include a convolutional neural network.

One or more tags for the color theme are determined using based on the color theme embedding (block 806). The one or more tags are generated using a second machine learning system, which may include a recurrent neural network. The color theme embedding generated in block 804 is used to bias the second machine learning system, providing the second machine learning system with a context for the color theme.

These tags determined in block 806 are suggested tags for the color theme, and can be output to the user (block 808). These determined tags can be displayed to the user, stored as corresponding to the color theme so that a user can subsequently search for color themes, and so forth. For example, a user can search for different color themes by inputting a desired tag, and having the stored color themes associated with that tag displayed.

User Interface

Figure 9:
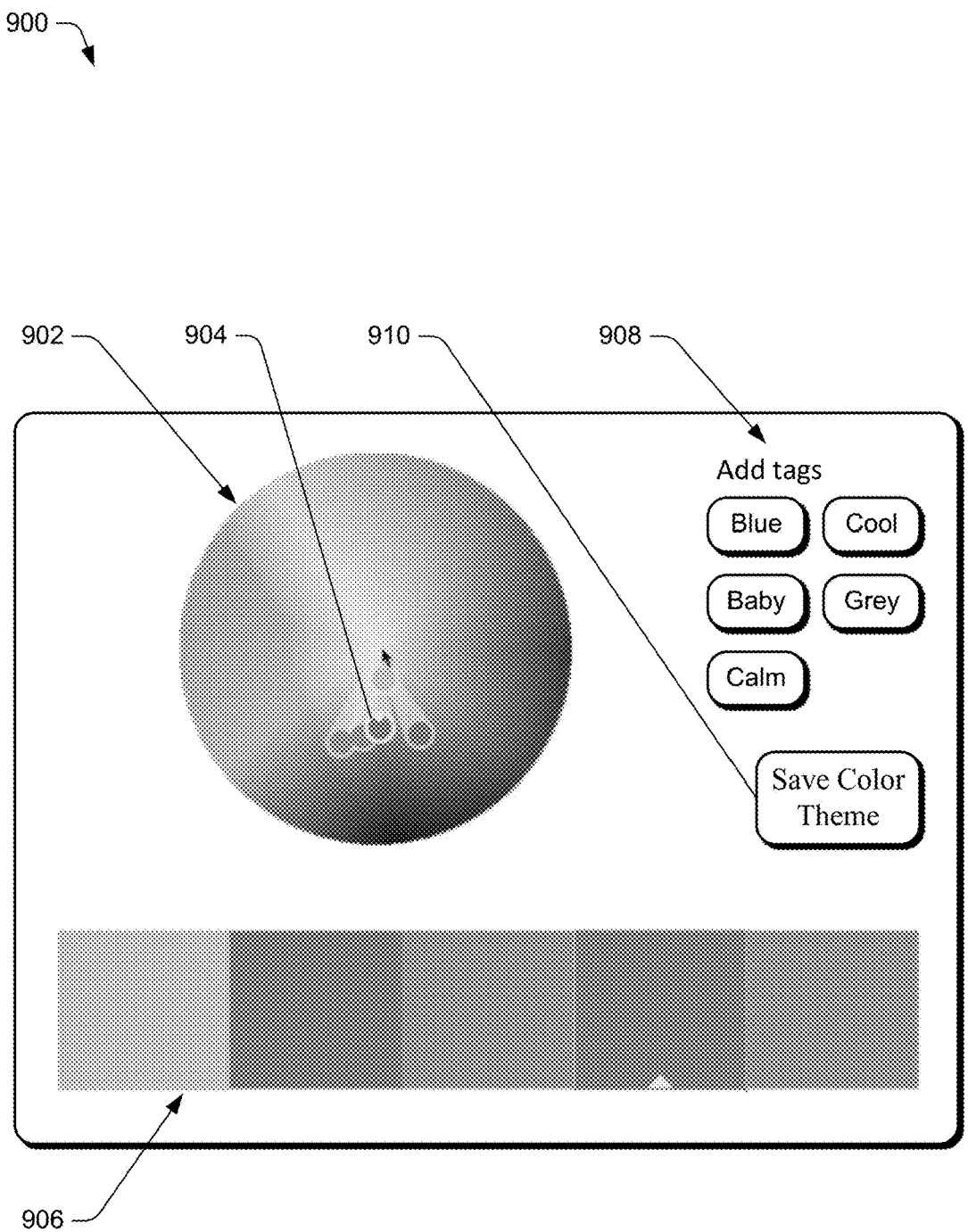
FIG. 9 illustrates an example user interface for using the automatic tag identification for color themes.

FIG. 9 illustrates an example user interface 900 for using the automatic tag identification for color themes. The user interface 900 can be displayed by, for example, the color theme selection system 122 of FIG. 1. The user interface 900 displays a color space in the form of a color wheel 902. A user can select different colors in the color space by selecting different portions or pixels of the color wheel 902. This selection can be clicking on a portion or pixel of the color wheel 902, moving around color indicators (such as indicator 904) to a different location on the color wheel 902, and so forth. In one or more implementations, five different colors indicators are shown as circles on the color wheel 902, each color indicator identifying a color selected by the user. The color theme selection system 122 applies various rules or criteria to position the color indicators on the color wheel 902, such as distances and directions each indicator is from one or more other indicators. The movement of one color indicator thus causes the positions of the other color indicators to change.

The color indicators on the color wheel 902 identify the multiple user selected colors, which are illustrated as color theme 906. The automatic tag identification system 104 of FIG. 1 generates multiple tags given the color theme 906, illustrated as tags 908. Thus, in this example, the automatic tag identification system 104 has identified tags for the color theme 906 of "Blue", "Cool", "Baby", "Grey", and "Calm". A user selectable button 910 is also illustrated, which can be selected by the user to save the tags 908 as corresponding to the color theme 906.

Figure 10:
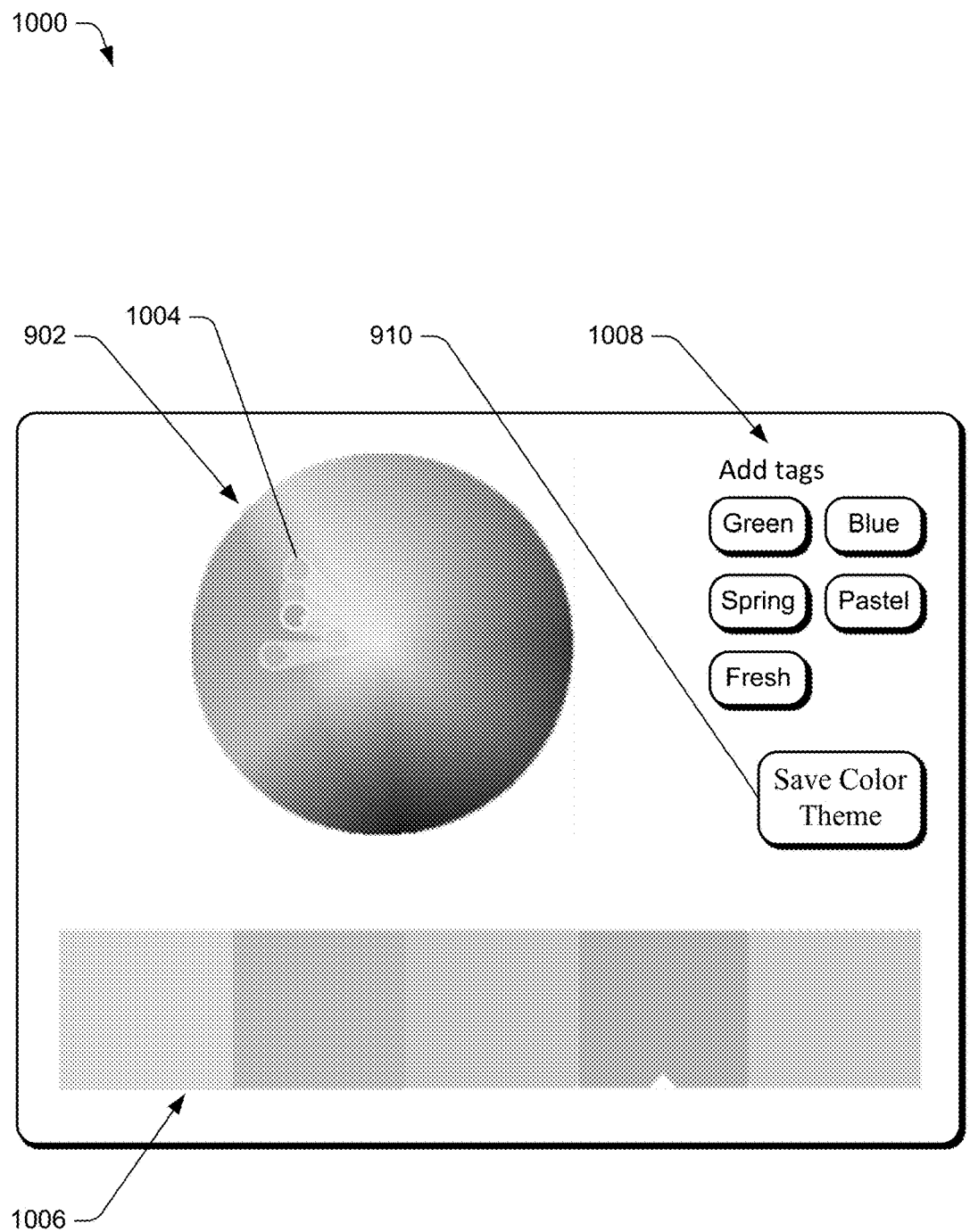
FIG. 10 illustrates another example user interface for using the automatic tag identification for color themes.

FIG. 10 illustrates another example user interface 1000 for using the automatic tag identification for color themes. The user interface 1000 is similar to the user interface 900 of FIG. 9, however differs in that the colors selected by the user are different than in FIG. 9. The user interface 1000 displays color wheel 902, and the color indicators on the color wheel 902 identify the multiple user selected colors, which are illustrated as color theme 1006. The automatic tag identification system 104 of FIG. 1 generates multiple tags given the color theme 1006, illustrated as tags 1008. Thus, in this example, the automatic tag identification system 104 has identified tags for the color theme 1006 of "Green", "Blue", "Spring", "Pastel", and "Fresh". The user selectable button 910 is also illustrated, which can be selected by the user to save the tags 1008 as corresponding to the color theme 1006.

Example System and Device

Figure 11:
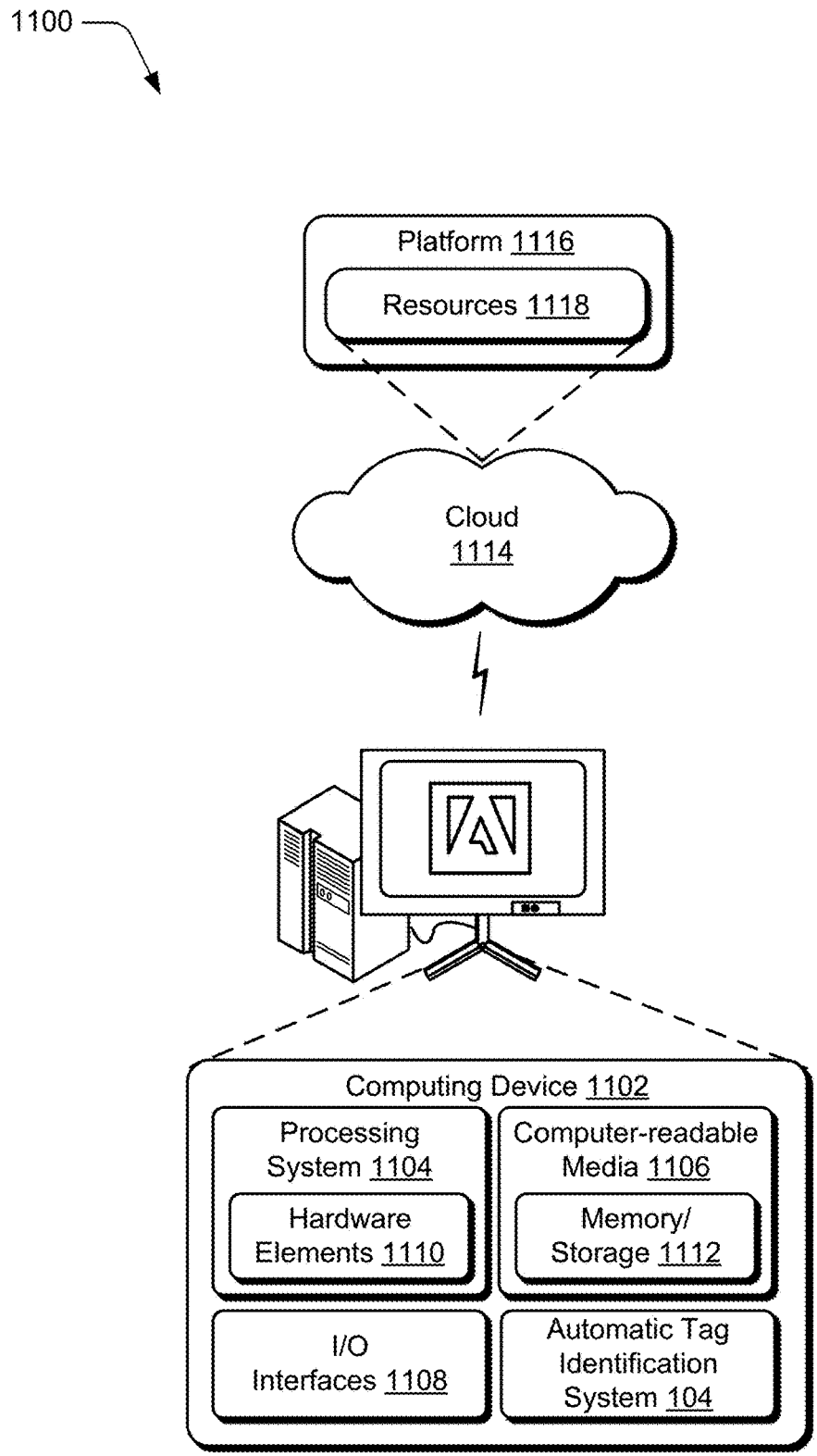
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the automatic tag identification system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, an indication of a color theme, the indication of the color theme comprising an indication of multiple colors in a color space;

generating, by the processing device, a color theme embedding for the color theme by providing the indication of the multiple colors to a convolutional neural network that generates the color theme embedding including a vector encoding of possible tags for the color theme from the indication of the multiple colors;

generating, by the processing device, an initial tag based on a user setting;

determining, by the processing device, multiple tags for the color theme by providing the color theme embedding to a Long Short Term Memory (LSTM) recurrent neural network that generates multiple tags for the color theme from the color theme embedding and the initial tag, each of the multiple tags comprising at least one word that describes the color theme, the LSTM recurrent neural network generating multiple tags in multiple iterations until a product of probabilities for the multiple tags in one of the multiple iterations is less than a threshold amount, the multiple tags for the color theme including one tag generated in each of the multiple iterations, the LSTM recurrent neural network including an embedding map that maps tags to an M-dimensional space based on which tags appear together in color themes, each tag of the multiple tags being one of a set of tags that includes a threshold number of known tags for corresponding color themes;

determining, by the processing device, a sequence for the multiple tags by biasing the LSTM recurrent neural network;

automatically associating, by the processing device, the multiple tags for the color theme with the color theme; and displaying, by the processing device, the multiple tags for the color theme as corresponding to the color theme.

2. The method as described in claim 1, the convolutional neural network having a convolutional layer that includes multiple convolutional filters, the generating the color theme embedding including using a different one of the multiple convolutional filters to analyze each different pair of colors in the multiple colors.

3. The method as described in claim 1, the receiving comprising receiving the multiple colors via user selection of the multiple colors on a color wheel display representing the color space.

4. The method as described in claim 1, the LSTM recurrent neural network having as initial inputs a pre-configured initial tag and the color theme embedding.

5. The method as described in claim 1, further comprising training the LSTM recurrent neural network using known color themes and corresponding user-selected tags.

6. A non-transitory computer-readable storage medium storing executable instructions, which when executed by a processing device, cause the processing device to perform operations comprising:

receiving an indication of a color theme, the indication of the color theme comprising an indication of multiple colors in a color space;

generating, using a convolutional neural network, a color theme embedding including a vector encoding of possible tags for the color theme from the indication of the multiple colors;

generating an initial tag based on a user setting;

using the color theme embedding to determine multiple tags for the color theme and using a Long Short Term Memory (LSTM) recurrent neural network to generate multiple tags in multiple iterations from the color theme embedding and the initial tag until a product of probabilities for the multiple tags in one of the multiple iterations is less than a threshold amount, the multiple tags for the color theme including one tag generated in each of the multiple iterations, and the multiple tags for the color theme being automatically associated with the color theme, the LSTM recurrent neural network including an embedding map that maps tags to an M-dimensional space based on which tags appear together in color themes, each tag of the multiple tags being one of a set of tags that includes a threshold number of known tags for corresponding color themes;

determining a sequence for the multiple tags by biasing the LSTM recurrent neural network; and displaying the multiple tags in the sequence for the color theme as corresponding to the color theme.

7. The non-transitory computer-readable storage medium of claim 6, wherein generating the color theme embedding further comprises using a different one of multiple convolutional filters of a convolutional layer of the convolutional neural network to analyze each different pair of colors in the multiple colors to generate the color theme embedding.

8. The non-transitory computer-readable storage medium of claim 6, wherein the LSTM recurrent neural network has initial inputs that include a pre-configured initial tag and the color theme embedding.

9. In a digital medium environment to generate color theme tags, a computing device comprising:

a processor; and computer-readable storage media having stored multiple instructions that, responsive to execution by the processor, cause the processor to perform operations comprising:

receiving an indication of a color theme, the indication of the color theme comprising an indication of multiple colors in a color space;

generating a color theme embedding for the color theme by providing the indication of the multiple colors to a convolutional neural network that generates the color theme embedding including a vector encoding of possible tags for the color theme from the indication of the multiple colors;

generating an initial tag based on a user setting;

determining one or more tags for the color theme by providing the color theme embedding to a Long Short Term Memory (LSTM) recurrent neural network that generates multiple tags for the color theme from the color theme embedding and the initial tag, each of the multiple tags comprising at least one word that describes the color theme, the LSTM recurrent neural network generating multiple tags in multiple iterations until a product of probabilities for the multiple tags in one of the multiple iterations is less than a threshold amount, the multiple tags for the color theme including one tag generated in each of the multiple iterations, the LSTM recurrent neural network including an embedding map that maps tags to an M-dimensional space based on which tags appear together in color themes, each tag of the multiple tags being one of a set of tags that includes a threshold number of known tags for corresponding color themes;

determining a sequence for the multiple tags by biasing the LSTM recurrent neural network; and automatically associating the multiple tags for the color theme with the color theme.

10. The computing device as described in claim 9, convolutional neural network having a convolutional layer that includes multiple convolutional filters, the generating the color theme embedding including using a different one of the multiple convolutional filters to analyze each different pair of colors in the multiple colors.

11. The computing device as described in claim 9, the operations further comprising:

receiving user selection of at least one tag of the one or more tags; and saving an indication of the at least one tag as corresponding to the color theme.

12. The computing device as described in claim 9, wherein the LSTM recurrent neural network has a pre-configured initial tag and the color theme embedding as initial inputs.

13. The computing device as described in claim 9, the operations further comprising training the LSTM recurrent neural network using known color themes and corresponding user-selected tags.

14. The method as described in claim 1, wherein the set of tags include most commonly appearing tags in a set of training data used to train the LSTM recurrent neural network.

15. The method as described in claim 1, wherein the initial tag is a most commonly appearing tag in a set of training data used to train the LSTM recurrent neural network.

16. The computing device as described in claim 9, the operations further comprising:

storing a record of the color theme as being associated with the multiple tags for the color theme.

17. The method as described in claim 1, further comprising passing the multiple tags through a fully connected layer to obtain a vector in a vocabulary space of possible tags and passing the multiple tags through a softmax activation to generate probabilities for each tag as an M-dimensional vector output.

18. The method as described in claim 17, wherein the each of the multiple tags from the LSTM recurrent neural network corresponds to a component of the M-dimensional vector output having a value greater than 0.

19. The method as described in claim 18, wherein the each of the multiple tags corresponds to a component of the M-dimensional vector output by the softmax activation having a largest value.

20. The method as described in claim 1, wherein the multiple colors include five colors, each of the five colors represented as a set of three values including a red value, a green value, and a blue value.

* * * * *